US011919004B2

(12) United States Patent
Beebe et al.

(10) Patent No.: US 11,919,004 B2
(45) Date of Patent: Mar. 5, 2024

(54) ONE-STEP SAMPLE EXTRACTION CASSETTE AND METHOD FOR POINT-OF-CARE MOLECULAR TESTING

(71) Applicant: Wisconsin Alumni Research Foundation, Madison, WI (US)

(72) Inventors: David Beebe, Monona, WI (US); Duane Juang, Madison, WI (US); Terry Juang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 89 days.

(21) Appl. No.: 17/461,326

(22) Filed: Aug. 30, 2021

(65) Prior Publication Data

US 2023/0068056 A1 Mar. 2, 2023

(51) Int. Cl.
*B01L 3/00* (2006.01)

(52) U.S. Cl.
CPC ..... *B01L 3/5029* (2013.01); *B01L 2200/0636* (2013.01); *B01L 2200/141* (2013.01); *B01L 2200/16* (2013.01); *B01L 2300/069* (2013.01); *B01L 2300/0829* (2013.01); *B01L 2300/161* (2013.01)

(58) Field of Classification Search
CPC combination set(s) only.
See application file for complete search history.

(56) References Cited

U.S. PATENT DOCUMENTS

| | | | | |
|---|---|---|---|---|
| 2015/0140646 | A1* | 5/2015 | Khattak | G01N 33/54326 422/430 |
| 2015/0266024 | A1 | 9/2015 | Leland | |
| 2016/0186240 | A1 | 6/2016 | Bitner | |
| 2018/0304260 | A1* | 10/2018 | Thomas | B01L 7/52 |

OTHER PUBLICATIONS

Connelly, John T. et al., 'A "Paper Machine" for Molecular Diagnostics', Analytical Chemistry, 2015, vol. 87, pp. 7595-7601.
Song, Jinzhao et al., 'A Multifunctional Reactor with Dry-Stored Reagents for Enzymatic Amplification of Nucleic Acids', Analytical Chemistry, 2018, vol. 90, pp. 1209-1216.
PCT International Search Report PCT/US2022/040165; dated Dec. 8, 2022; 4 pages.
PCT Written Opinion PCT/US2022/040165; dated Dec. 8, 2022; 4 pages.

* cited by examiner

*Primary Examiner* — Benjamin R Whatley
*Assistant Examiner* — Alex Ramirez
(74) *Attorney, Agent, or Firm* — Boyle Fredrickson, S.C.

(57) ABSTRACT

A sample extraction cassette and method are provided to test for a target in a sample. The sample is obtained on a swab. The swab is inserted into a chamber in a case and into contact with a contact portion of a membrane. The contact portion of the membrane is axially moved into sequential communication with a wash fluid and a reaction fluid. The reaction fluid reacts with the target to provide a visual display corresponding to the presence of the target.

13 Claims, 6 Drawing Sheets

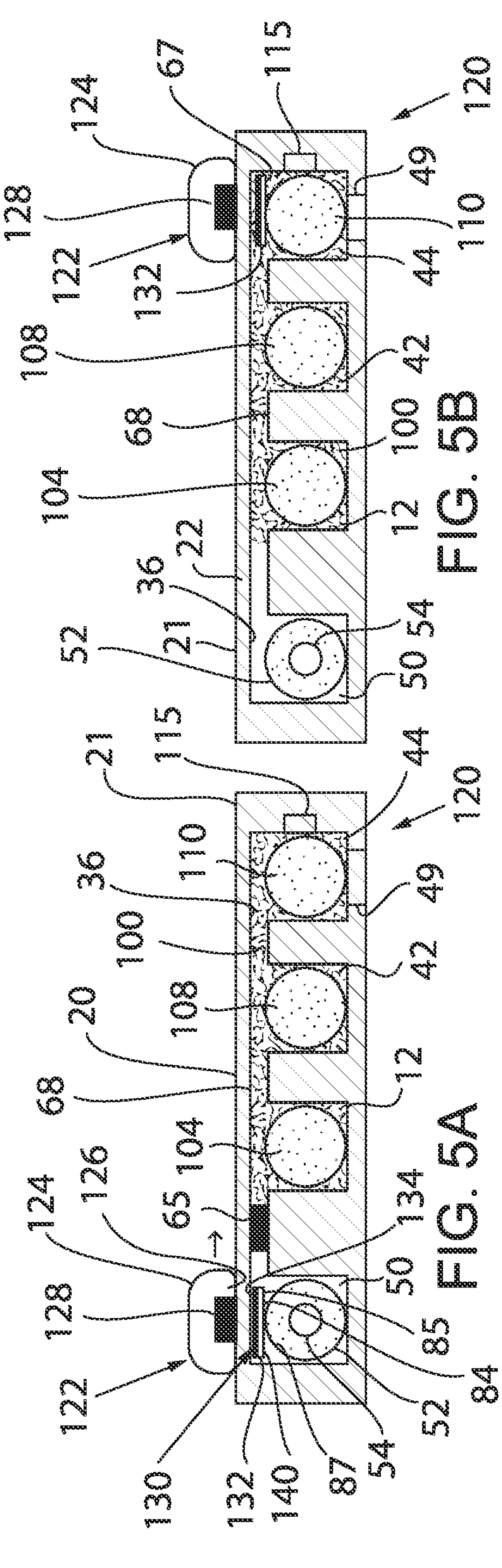
FIG. 5A
FIG. 5B
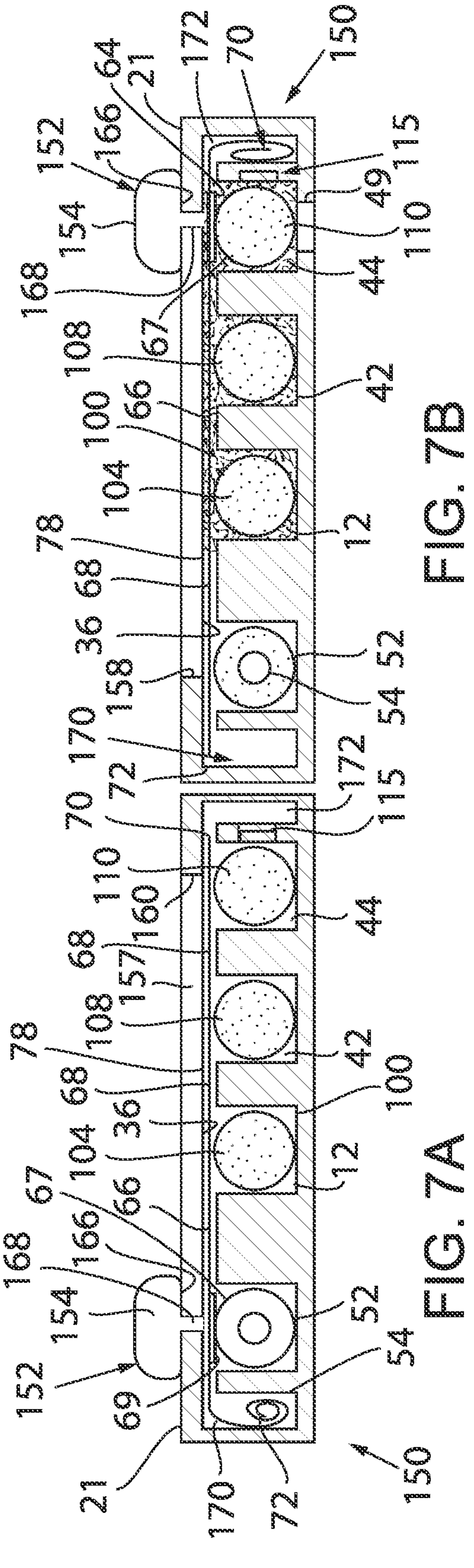
FIG. 7A
FIG. 7B

ONE-STEP SAMPLE EXTRACTION CASSETTE AND METHOD FOR POINT-OF-CARE MOLECULAR TESTING

GOVERNMENT GRANT

This invention was made with government support under CA247479, TR002373 and OD011106 awarded by the National Institutes of Health. The government has certain rights in the invention.

FIELD OF THE INVENTION

This invention relates generally to diagnostic testing, and in particular, to a one-step sample extraction cassette and method for point-of-care molecular testing for a target in a sample provided on a swab.

BACKGROUND AND SUMMARY OF THE INVENTION

As testing laboratories attempt to scale up existing protocols for SARS-CoV-2 testing, a number of shortcomings have emerged. These shortcomings include supply chain problems (e.g. lack of available RNA extraction kits and specialized equipment), the cost, time and/or effort required for the current test protocols and the relatively low throughput of nonautomated systems. Supply chain issues may be reduced, but not eliminated, as companies ramp up their production. However, the cost, time and/or effort required for the current test protocols and the throughput challenges are inherent in current testing methods. Hence, despite best efforts, it is clear that test availability and throughput do not meet current demands.

The current gold standard method for COVID-19 testing is a multi-step protocol involving RNA extraction using column-based or magnetic bead-based methods, followed by RT-qPCR-based detection of the extracted RNA. Unless automated platforms are employed, this extraction process is lengthy and laborious involving 1) mixing the sample with lysis/binding buffer and vortexing; 2) column-based or magnetic-bead-based capture of the viral RNA; 3) multiple washes (generally two to three washes) involving centrifugation or magnetic separation for each wash; 4) elution of viral RNA; 5) aspirating the eluted RNA and pipetting it into a PCR plate loaded with RT-qPCR master mix; and 6) placing the PCR plate in a specialized fluorescent qPCR instrument to run thermocycling and data capture. This process usually takes 3-4 hours and is hard to scale because: 1) the RNA extraction process is time consuming due to the multiple pipetting and centrifugation/magnetic separation steps for washing; and 2) the RT-qPCR process itself takes approximately one (1) hour with continuous "real-time" fluorescence measurements at each cycle. Since most machines are designed to handle one plate at a time, the turnaround time is significantly limited.

In view of the foregoing, real-world sample-to-result turnaround time for COVID-19 tests is at least 1 to 2 days. The substantial turnaround time for real-world COVID-19 tests greatly diminishes the value of conducting a PCR test in many scenarios. Moreover, large-scale, centralized community sample collection sites themselves pose a potential risk for infectious disease exposure, as subjects need to remove face coverings to perform nasal swabs or saliva collection.

One way to greatly reduce assay turnaround time is to perform rapid, individualized, standalone tests on site (point of care—POC). However, due to technical, logistical, and monetary challenges, standard RT-qPCR based molecular tests are challenging to deploy in a POC setting. These challenges include: 1) a requirement for precision liquid handling operations; 2) complex instrumentation; 3) use of toxic reagents; 4) strict biosafety requirements; and 5) skilled personnel to perform the tests. Although there has been recent progress in deploying rapid COVID-19 antigen tests (lateral flow immunoassay tests), the sensitivity and specificity of rapid antigen tests still lag significantly behind molecular tests and often require additional verification using PCR. In addition, POC molecular (RNA) tests are relatively costly, complex, bulky, and of very limited availability Therefore, it is a primary object and feature of the present invention to provide a one-step sample extraction cassette for point-of-care molecular testing.

It is a further object and feature of the present invention to provide a one-step sample extraction cassette for point-of-care molecular testing which reduces the cost, effort, complexity and reagent consumption associated with prior devices/methods, while decreasing the turnaround time over these prior devices/methods.

It is a still further object and feature of the present invention to provide a one-step sample extraction cassette for point-of-care molecular testing which is simple and inexpensive as compared with prior devices/methods.

In accordance with the present invention, a sample extraction cassette is provided for point-of-care molecular testing for a target in a sample provided on a swab. The cassette includes a case having a chamber configured for receiving the swab; a wash zone configured for receiving a wash fluid therein; and a reaction zone configured for receiving a reaction fluid therein. The reaction fluid reacts with the target. A membrane having a contact portion is slidably receivable into case. The membrane is moveable between a transfer position, a wash position and a reaction position. In the transfer position, the contact portion of the membrane communicates with the sample provided on the swab when the swab is received in the chamber such that at least a portion of the sample is transferred to the contact portion. In the wash position, the contact portion of the membrane communicates with the wash zone. In the reaction position, the contact portion of the membrane communicates with the reaction zone.

The wash zone is defined by a wash well in the case. The wash well is adapted for receiving the wash fluid therein. The reaction zone is defined by a reaction well in the case. The reaction well is adapted for receiving the reaction fluid therein. Oil is receiveable in the wash well and the reaction well. The oil fluidially isolates the wash fluid from the reaction fluid when the wash fluid is received in the wash well and the reaction fluid is received in the reaction well.

The case is defined by a plurality of surfaces. The plurality of surfaces are hydrophobic. The contact portion of the membrane is defined by a hydrophilic adsorbent pad. The membrane extends along an axis and has a terminal leading end. The hydrophilic adsorbent pad is spaced from the terminal leading end of the membrane. The hydrophilic adsorbent pad includes a generally arcuate leading edge having first and second ends. A trailing edge is defined by a first portion extending from the first end of the leading edge and a second portion extending from the second end of the leading edge. The first and second portions of the trailing edge converge as the first and second portions of the trailing edge extend from a corresponding first and second ends of the leading edge.

A slide is slidably connected to the case and operatively connected to the membrane. The sliding of the slide relative to the case moves the membrane between the transfer position, the wash position and the reaction position. A dried reagent may be provided in communication with the reaction zone. The reaction fluid is defined by a mixture of the dried reagent and an aqueous solution. A barrier material may be provided about the dried reagent to prevent contamination thereof. The barrier material is solid at first temperature and melts at a second, higher temperature.

The membrane includes first and second sides and a lower surface interconnecting the first and second sides. First and second barbs extend from corresponding first and second sides. The first and second barbs allow for slideable movement of the membrane in a first direction and prevents slideable movement of the membrane in a second, opposite direction.

In accordance with a further aspect of the present invention, a sample extraction cassette is provided to test for a target in a sample provided on a swab. The cassette includes a case having a chamber configured for receiving the swab, a wash zone configured for receiving a wash fluid therein, and a reaction zone configured for receiving a reaction fluid therein. The reaction fluid reacts with the target. A membrane is slideable in a first direction within the case. The membrane has a contact portion which sequentially communicates with the swab, the wash zone and the reaction zone as the membrane is axially slid in the case in the first direction.

An oil is receiveable in the wash zone and the reaction zone. The oil fluidially isolates the wash fluid from the reaction fluid when the wash fluid is received in the wash zone and the reaction fluid is received in the reaction zone. The case is defined by a plurality of surfaces. The plurality of surfaces are hydrophobic. The contact portion of the membrane is defined by a hydrophilic adsorbent pad. The membrane extends along an axis and has a terminal leading end. The hydrophilic adsorbent pad defines the terminal leading end of the membrane. The hydrophilic adsorbent pad includes a generally arcuate leading edge having first and second ends. A trailing edge is defined by a first portion extending from the first end of the leading edge and a second portion extending from the second end of the leading edge. The first and second portions of the trailing edge converge as the first and second portions of the trailing edge extend from a corresponding first and second ends of the leading edge.

A slide may be slidably connected to the case and operatively connected to the membrane. Sliding of the slide relative to the case moves the membrane in the first direction. A dried reagent may be provided in communication with the reaction zone. The reaction fluid is defined by a mixture of the dried reagent and an aqueous solution. A barrier material extends about the dried reagent to prevent contamination thereof. The barrier material is solid at first temperature and melts at a second, higher temperature.

The membrane includes first and second sides interconnected by a lower surface. First and second barbs extend from corresponding first and second sides. The first and second barbs allow for slideable movement of the membrane in the first direction and prevent slideable movement of the membrane in a second, opposite direction. The lower surface of the membrane includes the contact portion.

In accordance with a still further aspect of the present invention, a method of point-of-care molecular testing for a target in a sample is provided. The method includes the steps obtaining the sample on a swab and inserting the swab into a chamber in a case into contact with a contact portion of a membrane. The contact portion of the membrane is axially moved into sequential communication with a wash fluid and a reaction fluid. The reaction fluid reacts with the target.

Oil may be deposited within the case to fluidially isolate the wash fluid from the reaction fluid. The case is defined by a plurality of surfaces. The plurality of surfaces being hydrophobic. The contact portion of the membrane is defined by a hydrophilic adsorbent pad. The membrane extends along an axis and has a terminal leading end. The hydrophilic adsorbent pad spaced from the terminal leading end of the membrane. The hydrophilic adsorbent pad includes a generally arcuate leading edge having first and second ends. A trailing edge is defined by a first portion extending from the first end of the leading edge and a second portion extending from the second end of the leading edge. The first and second portions of the trailing edge converge as the first and second portions of the trailing edge extend from a corresponding first and second ends of the leading edge.

A slide operatively connected to the membrane to move the membrane into sequential communication with the wash fluid and the reaction fluid. Prior to axially moving the contact portion of the membrane into communication the reaction fluid, a reagent may be dried within the case. A barrier material is deposited on the dried reagent to isolate the dried reagent from an external environment. An aqueous droplet is deposited on the barrier material. The barrier material is exposed to an elevated temperature to allow aqueous droplet to mix with the dried reagent to form the reaction fluid. Alternatively, prior to axially moving the contact portion of the membrane into communication the reaction fluid, an aqueous droplet may be deposited adjacent the dried reagent. When the contact portion of the membrane is moved axially, the contact portion of the membrane brings the aqueous droplet into contact with the dried reagent to allow the aqueous droplet to mix with the dried reagent to form the reaction fluid. The contact portion of the membrane axially moves in a first direction and prevented from axially movement in a second direction opposite to the first direction. Alternatively, prior to axially moving the contact portion of the membrane into communication the reaction fluid, an aqueous droplet may be deposited adjacent the dried reagent. The aqueous droplet may be moved into contact with the dried reagent to allow the aqueous droplet to mix with the dried reagent to form the reaction fluid.

BRIEF DESCRIPTION OF THE DRAWINGS

The drawings furnished herewith illustrate a preferred methodology of the present invention in which the above advantages and features are clearly disclosed as well as others which will be readily understood from the following description of the illustrated embodiment.

In the drawings:

FIG. 5A is a cross sectional view, similar to FIG. 3A, showing an further alternate configuration of the one-step sample extraction cassette of the present invention in an initial configuration;

FIG. 5B is a cross sectional view, similar to FIG. 3B, showing the one-step sample extraction cassette of FIG. 5A in a reaction configuration;

FIG. 7A is a cross sectional view, similar to FIG. 3A, showing the one-step sample extraction cassette of FIG. 6 in an initial configuration;

FIG. 7B is a cross sectional view, similar to FIG. 3B, showing the one-step sample extraction cassette of FIG. 7A in a reaction configuration;

DETAILED DESCRIPTION OF THE DRAWINGS

Figure 1:
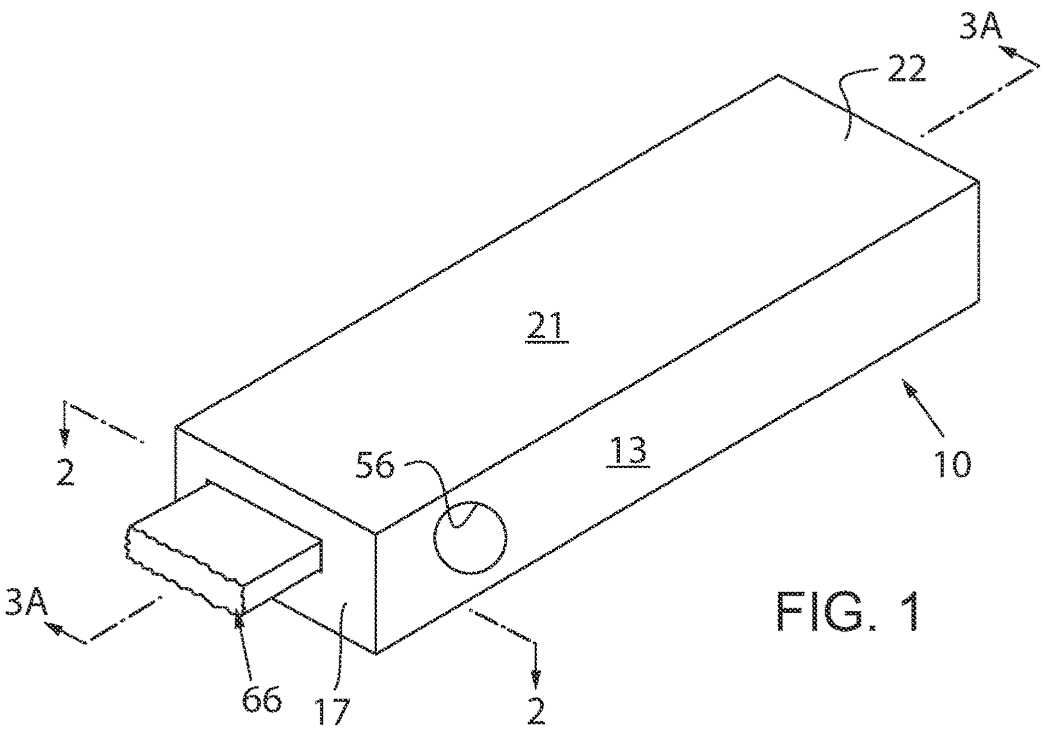
FIG. 1 is an isometric view of a one-step sample extraction cassette in accordance with the present invention.
Figure 2:
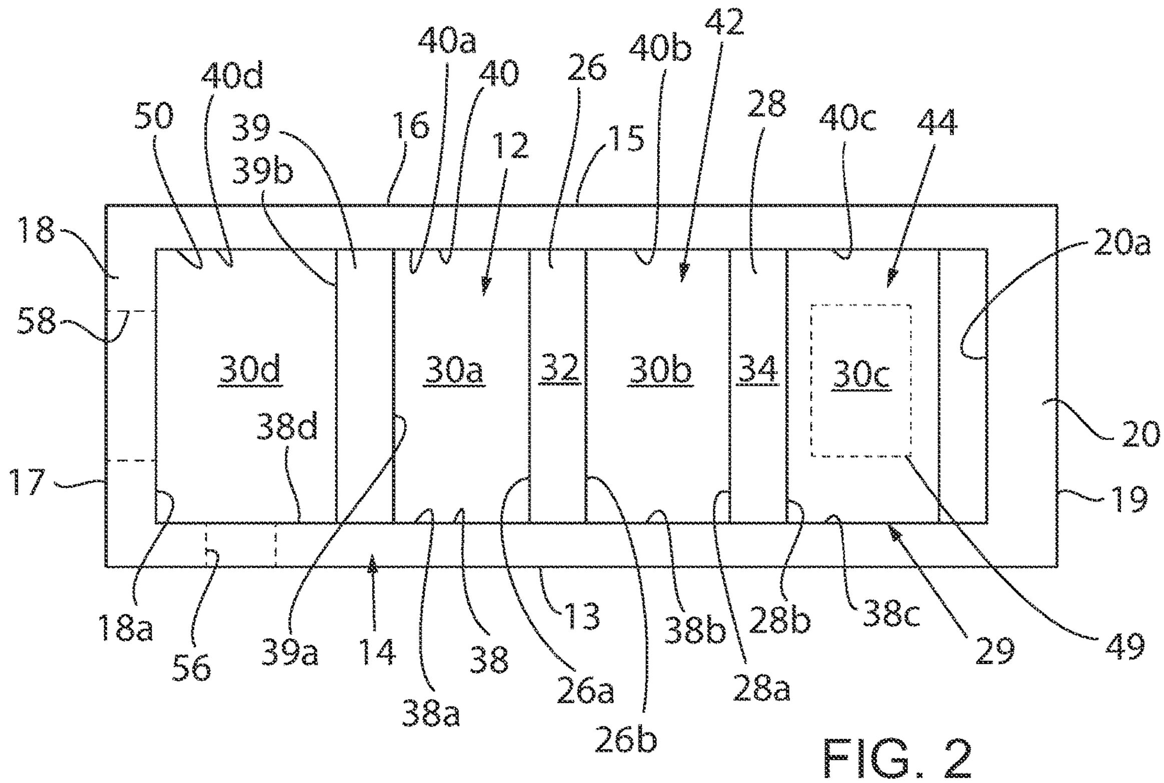
FIG. 2 is a cross sectional view of the one-step sample extraction cassette of the present invention taken along line 2-2 of FIG. 1.

Referring to FIG. 1, an extraction cassette in accordance with the present invention, is generally designated by the reference numeral 10. It is contemplated to fabricate cassette 10 out of a heat-resistant plastic material (e.g., polycarbonate or polycarbonate resin thermoplastic), which allows for a wide temperature working range for both cold chain transport and isothermal amplification, as hereinafter described. It is noted that polycarbonate has a working temperature ranging from −40° Celsius ("C") to 115-130° C.

In the depicted configuration, cassette 10 extends along an axis and is defined by first and second sidewalls 14 and 16, respectively, first and second end walls 18 and 20, respectively, upper wall 22 and bottom wall 24. First and second sidewalls 14 and 16, respectively, includes first and second outer side surfaces 13 and 15, respectively, and first and second end walls 18 and 20, respectively, include first and second outer end surfaces 17 and 19, respectively. Upper wall 22 includes an upper surface 21 and bottom wall 24 includes a lower surface 23. It can be understood that cassette 10 may have other external configurations without deviating from the scope of the present invention Cassette 10 further includes a plurality of wells formed within interior chamber 29 thereof. More specifically, interior chamber 29 is defined by inner surfaces 38 and 40 of first and second sidewalls 14 and 16, respectively; first chamber end wall 39 and first end wall 20; lower surface 36 of upper wall 22; and upper surface 30 of bottom wall 24. First and second well walls 26 and 28, respectively, project from upper surface 30 of bottom wall 24 and terminate at corresponding upper end surfaces 32 and 34, respectively. Upper end surfaces 32 and 34 of first and second well walls 26 and 28, respectively, lie in a generally common plane which is parallel to and are spaced from lower surface 36 of upper wall 22 by passages 33 and 35, respectively. Passage 37 is provided in second chamber end wall 20 and is axially aligned with passages 33 and 35, for reasons hereinafter described.

First wash well 12 is defined by leading surface 39*a* of first chamber end wall 39, trailing surface 26*a* of first well wall 26, first well portion 30*a* of upper surface 30 of bottom wall 24, first portion 38*a* of inner surface 38 of first sidewall 14, and first portion 40*a* of inner surface 40 of second sidewall 16. Second wash well 42 is defined by leading surface 26*b* of first well wall 26, trailing surface 28*a* of second well wall 28, second well portion 30*b* of upper surface 30 of bottom wall 24, second portion 38*b* of inner surface 38 of first sidewall 14, and second portion 40*b* of inner surface 40 of second sidewall 16. Reaction well 44 is defined by leading surface 28*b* of second well wall 28, trailing surface 20*a* of second end wall 20, third well portion 30*c* of upper surface 30 of bottom wall 24, third portion 38*c* of inner surface 38 of first sidewall 14, and third portion 40*c* of inner surface 40 of second sidewall 16. It is contemplated to provide a transparent window 49 in cassette 10, for example in bottom wall 24, to allow for optical measurement/interrogation of the interior of reaction well 44, for reasons hereinafter described.

Figure 2A:
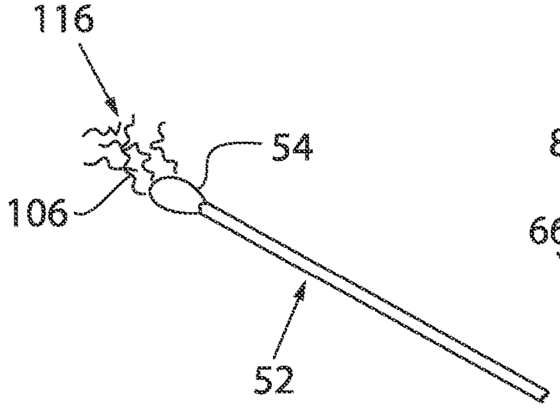
FIG. 2A is an isometric view of an anterior nares swab for use with the one-step sample extraction cassette of the present invention.

Cartridge 10 further includes swab chamber 50 adapted for receiving an end 52 of a conventional, sample collection swab 54, FIG. 2A. Swab chamber 50 is defined by leading surface 18*a* of first end wall 18, trailing surface 39*b* of first chamber end wall 39, swab chamber portion 30*d* of upper surface 30 of bottom wall 24, fourth portion 38*d* of inner surface 38 of first sidewall 14, and fourth portion 40*d* of inner surface 40 of second sidewall 16. Opening 56 extends through first sidewall 14 so as to allow access to swab chamber 50. In the depicted embodiment, opening 56 has a generally circular configuration. However, other configurations of opening 56 are possible without deviating from the scope of the present invention.

First end wall 18 includes a passage 58 extending therethrough having an output end communicating with swab chamber 50. Similarly, first chamber end wall 39 has a passage 60 extending therethrough in axial alignment with passage 58. Input end 62 of passage 60 communicates with swab chamber 50 and output end 64 of passage 60 communicates with axially aligned with passages 33, 35 and 37, as heretofore described. Further, it is intended for passages 58, 60, 33, 35 and 37 to collectively define a pathway 68 having sufficient dimension to accommodate slidable receipt of membrane 66, as hereinafter described.

Figure 3B:
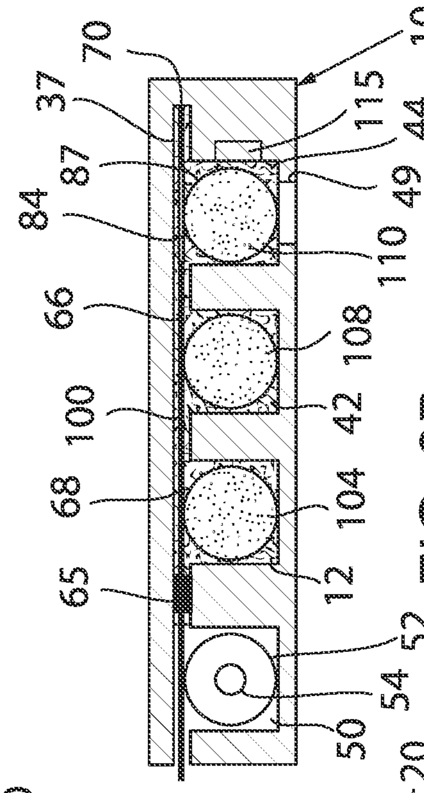
FIG. 3B is a cross sectional view, similar to FIG. 3A, of the one-step sample extraction cassette of the present invention in a reaction configuration.
Figure 3A:
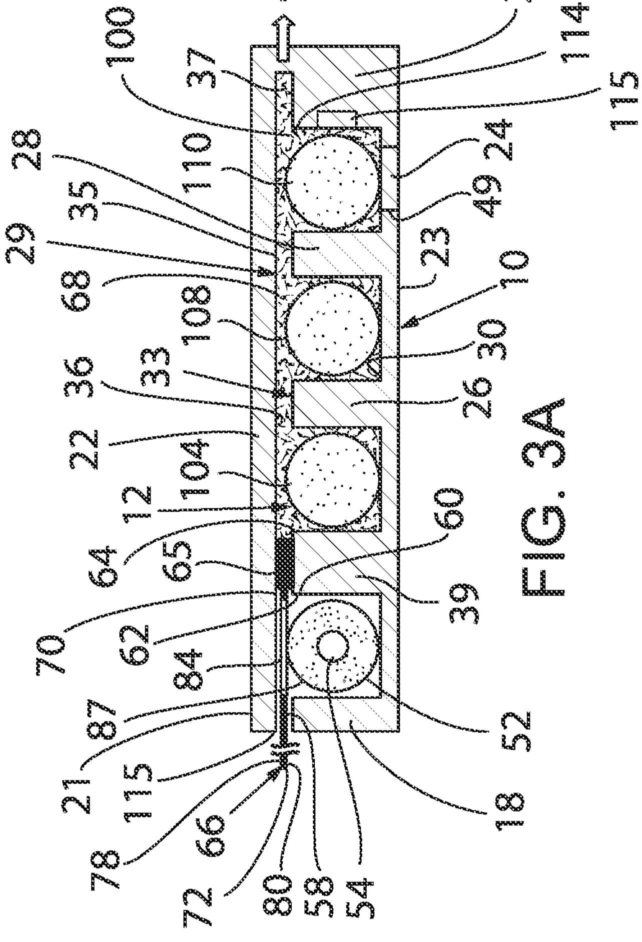
FIG. 3A is a cross sectional view of the one-step sample extraction cassette of the present invention in an initial configuration taken along line 3A-3A of FIG. 1.
Figure 8:
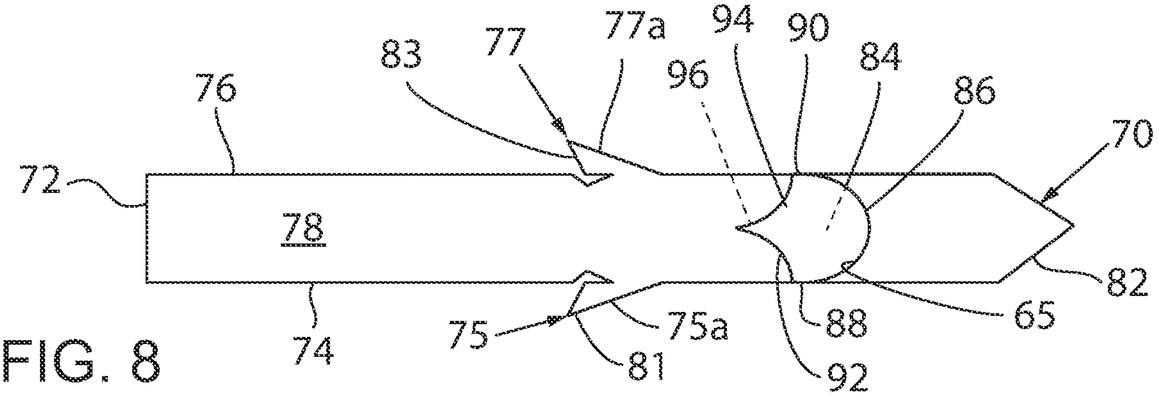
FIG. 8 is a top plan view of a membrane for the one-step sample extraction cassette of the present invention.

As best seen in FIGS. 3A and 8, membrane 66 is defined by a leading end 70 and trailing end 72, first and second generally parallel sides 74 and 76, respectively, and upper and lower surfaces 78 and 80, respectively. It is intended for membrane 66 to be fabricated from a flexible material having sufficient rigidity to be slid through pathway 68. In addition, membrane 66 is fabricated from hydrophobic material or coated by a hydrophobic material, for reasons hereinafter described. Further, it contemplated for the leading end 70 of membrane 66 to define leading edge 82 which facilitate the sliding of membrane 66 through pathway 68 in a first direction, as hereinafter described; to pierce puncturable seal 65; and to prevent membrane 66 from becoming hung up within cartridge 10 during a sliding operation.

Figure 9:
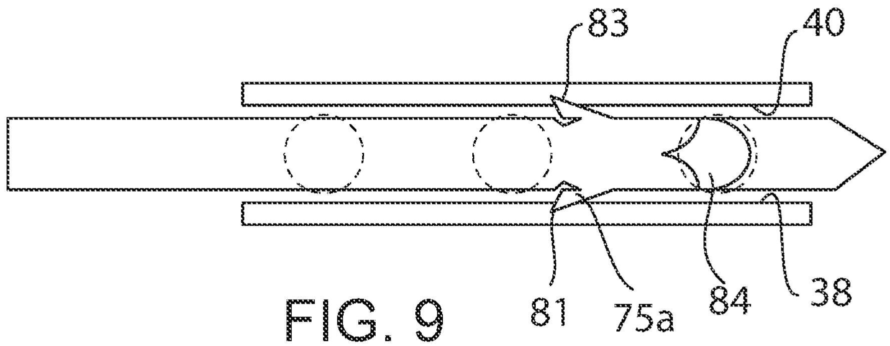
FIG. 9 is a top plan view of the membrane of FIG. 8 received in a pathway of the one-step sample extraction cassette of the present invention.

Barbs 75 and 77 are provided on corresponding sides 74 and 76, respectively, of membrane 66. Barbs 75 and 77 are moveable between an extended position when barbs 75 and 77 are urged away from sides 74 and 76, respectively, and a retracted position wherein barbs 75 and 77 are adjacent corresponding sides 74 and 76, respectively, thereof. It can be understood that as membrane 66 is slid in a first direction along pathway 68, leading edges 75*a* and 77*a* of barbs 75 and 77, respectively, are engageable with inner surfaces 38 and 40 of first and second sidewalls 14 and 16, respectively, thereby urging barbs 75 and 77 urged toward their retracted position and allowing membrane 66 to continue sliding in the first direction, FIG. 9. In contrast, when one attempts to slide membrane 66 along pathway 68 in a second direction, opposite to the first direction, tips 81 and 83 of leading edges 75*a* and 77*a* of barbs 75 and 77, respectively, engage inner surfaces 38 and 40 of first and second sidewalls 14 and 16, respectively, and prevent membrane 66 from sliding in the second direction.

Figure 8A:
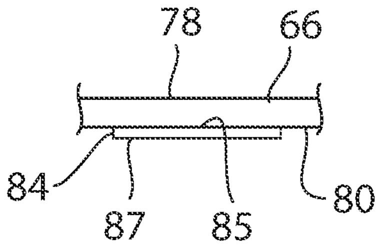
FIG. 8A is an enlarged, side elevational view showing a portion of an alternate configuration of the membrane of FIG. 8.

Adsorbent pad, generally designated by the reference numeral 84, may be formed in membrane 66 or affixed to lower surface 80 of membrane 66 at a location. Adsorbent pad 84 includes an upper surface 85 and a lower surface 87. By way of example, adsorbent pad 84 may be secured within aperture 65 extending through membrane 66. Alternatively, upper surface 85 of adsorbent pad 84 may be affixed lower surface 80 of membrane 66, FIG. 8A. It is intended for adsorbent pad 84 to be fabricated from a material or treated with a material that will bind to a target, such as an analyte of interest, as hereinafter described.

Adsorbent pad 84 has a generally arcuate leading edge 86 having a first end 88 adjacent first side 74 of membrane 66 and a second end 90 adjacent second side 76 of membrane 66. First and second trailing edges 92 and 94, respectively, of adsorbent pad 84 extend rearwardly from corresponding first and second end 88 and 90, respectively, away from leading edge 82 of membrane 66 and intersect each other at intersection 96. First and second trailing edges 92 and 94, respectively, have generally concave configurations such that adsorbent pad 84 has a generally teardrop-shape.

In order to load cassette 10, interior chamber 29, including first and second wash wells 12 and 42, respectively, reaction well 44, and passages 33, 35 and 37, is filled with a selected fluid, such as oil 100. It is noted that oil 100 flows through first and second wash wells 12 and 42, respectively, reaction well 44, and passages 33, 35 and 37 via capillary action owing to the hydrophobic nature of the surfaces, i.e. an oleophilic version of capillary action.

With each of the plurality of first and second wash wells 12 and 42, respectively, reaction well 44, and passages 33, 35 and 37 filled with oil 100, a pipet may be used to deliver drop 104 of a first aqueous solution, e.g., water, into first wash well 12. It is intended for the first aqueous solution to wash away unbound analyte from adsorbent pad 84, as hereinafter described, with the minimal loss of any targets 106 bound to adsorbent pad 84. It is contemplated for the first aqueous solution of drop 104 and oil 100 to have a first interfacial tension. Similarly, the first aqueous solution of drop 104 and the surfaces of cassette 10 defining interior chamber 29 have a second interfacial tension. The second interfacial tension is greater than or equal to the first interfacial tension, thereby giving rise to liquid repellency between drop 104 and the surfaces defining interior chamber 29 of cassette 10. It is noted that drop 104 has a diameter greater than the dimension of passage 33 and greater than the dimension of output end 64 of passage 60 such that drop 104 is retained in first wash well 12.

Similarity, a pipet may be used to deliver drop 108 of a second aqueous solution, e.g., ethanol, into second wash well 12. The second aqueous solution may be the same or different from the first aqueous solution. It is intended for the second aqueous solution to wash away any unbound analyte from adsorbent pad 84, as hereinafter described, with the minimal loss of any targets 106 bound to adsorbent pad 84. It is contemplated for the aqueous solution of drop 108 to have a third interfacial tension. The second interfacial tension is greater than or equal to the third interfacial tension, thereby giving rise to liquid repellency between drop 108 and the surfaces defining interior chamber 29 of cassette 10. It is noted that drop 108 has a diameter greater than the dimension of passage 35 and greater than the dimension of passage 37 such that drop 108 is retained in second wash well 42.

A pipet may be used to deliver drop 110 of a reaction solution into reaction cavity 44. It is contemplated for a parameter of the reaction solution drop to change in response to the presence of target 106, thereby allowing detection of target 106 from a collected sample. For example, if drop 110 of the reaction solution includes an isothermal nucleic acid amplification reagent, a change in color, fluorescence intensity, absorbance, or precipitation of drop 110 will occur in response to the presence of target 106. To facilitate understanding of the present invention, a colorimetric loop-mediated isothermal amplification (LAMP) solution is used as an exemplary reaction solution in cassette 10 and methodology of the present invention. However, it can be appreciated that drop 110 may be formed from other reaction solutions, including those that do not require the heating of drop 110 hereinafter described, without deviating from the scope of the present invention.

As is known, the LAMP solution provides a visible indicator (e.g. a color change) in response to the presence of the desired target, e.g., target 106, after incubation. More specifically, drop 110 of the LAMP solution is provided in reaction cavity 44, e.g. by a pipet or similar tool delivering drop 110 directly into oil 100. It is contemplated for the reaction solution of drop 110 to have a fourth interfacial tension wherein the second interfacial tension is greater than or equal to the fourth interfacial tension, thereby giving rise to liquid repellency between drop 110 and the surfaces defining interior chamber 29 of cassette 10. It is noted that drop 110 has a diameter greater than the dimension of passage 35 and greater than the dimension of input end 114 of passage 37 is provided in second chamber end wall 20 such that drop 110 is retained in reaction well 44.

It can be understood that oil 100 in interior chamber 29: 1) prevents evaporation of drops 104, 108 and 110; 2) provides a barrier to prevent contamination of drops 104, 108 and 110 from the external environment; 3) prevents the LAMP solution from leaking from cassette 10 thereby contaminating the external environment; and 4) makes long-term storage of cassette 10 possible by physically constraining the individual aqueous solutions in first well 12, second well 42 and reaction well 44.

Figure 4B:
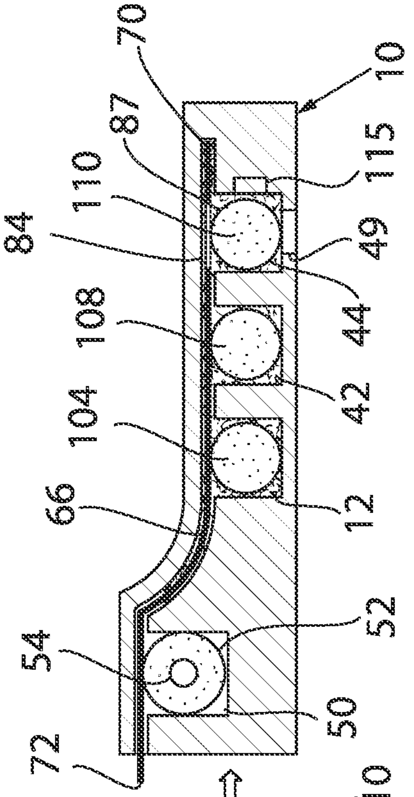
FIG. 4B is a cross sectional view, similar to FIG. 3B, showing the one-step sample extraction cassette of FIG. 4A in a reaction configuration.
Figure 4A:
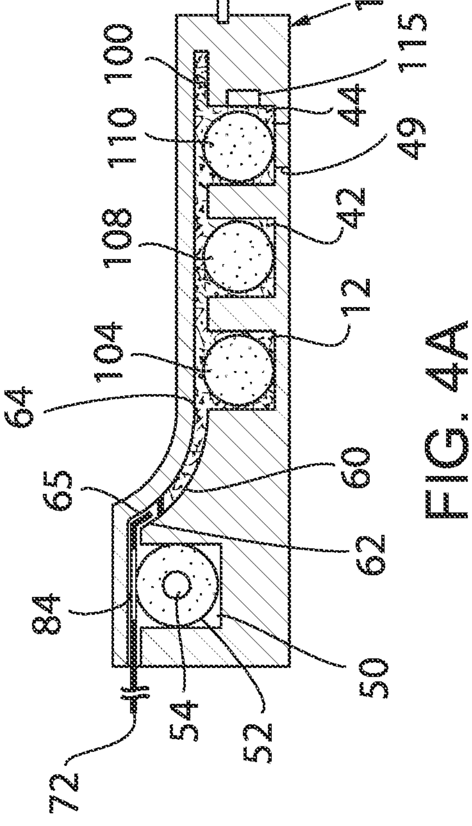
FIG. 4A is a cross sectional view, similar to FIG. 3A, showing an alternate configuration of the one-step sample extraction cassette of the present invention in an initial configuration.

Further, with interior chamber 29 of cassette 10 filled as heretofore described, it is contemplated for oil 100 to be allowed to solidify therein so as to prevent oil 100 from flowing into swab chamber 50 through passage 60 during transport. Alternatively, a puncturable seal 65 may be provided in passage 60 to isolate swab chamber 60 from first wash well 12. Referring to FIGS. 4A-4B, in a still further alternative, it is contemplated for passage 60 to have a generally concave configuration wherein input end 62 of passage 60 lies in a first plane and output end 64 of passage 60 lies in a second plane vertically spaced from the first plane so us to discourage the flow of oil 100 upward from first wash well 12 to swab chamber 50. Of course, puncturable seal 65 may be provided in passage 60 in such a configuration to fluidically isolate swab chamber 50 from first wash well 12.

Referring to FIGS. 3A-3B and 4A-4B, in operation, leading end 70 of membrane 66 is inserted into input end 117 of passage 58 and urged axially in a first direction to an initial position such that: 1) leading end 70 of membrane 66 extends through passage 58 and swab chamber 50 into input end 62 of passage 60; and 2) lower surface 87 of adsorbent pad 84 communicates with swab chamber 50. To test for the presence of target 106, end 52 of swab 54 can be used for collection of other clinical and/or environmental samples. For example, end 52 of swab 54 may be inserted into one or both nostrils of the individual and rotated therein while pressed against the inside of the nostril to transfer as much nasal discharge onto end 52 of swab 54, hereinafter referred to swab sample 116. Swab 54 is removed from the nostril[s]. End 52 of swab 54 is inserted through opening 56 in first sidewall 14 of cassette 10 and into swab chamber 50. End 52 of swab 54 is pressed against lower surface 87 of adsorbent pad 84 and rotated so as to transfer swab sample 116 onto adsorbent pad 84.

Once swab sample 116 is transferred onto adsorbent pad 84, membrane 66 is urged axially in the first direction further into cassette 10 to a first wash position. More specifically, membrane 66 is urged into cassette 10 along pathway 68 such that: 1) leading end 70 of membrane 66 pierces puncturable seal 65 in passage 60, if present, and passes through passage 60, out of output end 64 thereof, through first wash well 12 and passage 33, and into second wash well 42; and 2) adsorbent pad 84 communicates with first wash well 12. With adsorbent pad 84 communicating with first wash well 12, it is intended for lower surface 87 of adsorbent pad 84 to communicate with drop 104 in first wash well 12 such that the first aqueous solution washes away any unbound analyte on adsorbent pad 84 with minimal loss of any targets 106 bound to adsorbent pad 84.

After the first aqueous solution washes away any unbound analyte on adsorbent pad 84, membrane 66 is urged axially in the first direction further into cassette 10 to a second wash position. More specifically, membrane 66 is urged into cassette 10 along pathway 68 such that: 1) leading end 70 of membrane 66 passes through second wash well 42, through passage 35 and into reaction well 44; and 2) adsorbent pad 84 communicates with second wash well 42. The "teardrop" shape of adsorbent pad 84, as heretofore described, facilitates the breakoff of adsorbent pad 84 from drop 104 in first wash well 12 so as to minimize, and preferably prevent, the dragging of the first aqueous solution into drop 108 of the second aqueous solution in second wash well 42. With adsorbent pad 84 communicating with second wash well 42, it is intended for lower surface 87 of adsorbent pad 84 to communicate with drop 108 in second wash well 42 such that the second aqueous solution washes away any unbound analyte from adsorbent pad 84 with minimal loss of any targets 106 bound to adsorbent pad 84.

After the second aqueous solution washes away any unbound analyte on adsorbent pad 84, membrane 66 is urged axially in the first direction further into cassette 10 to a third, reaction position. More specifically, membrane 66 is urged into cassette 10 along pathway 68 such that: 1) leading end 70 of membrane 66 passes through reaction well 44, through input of passage 37 in second end wall 20, and into passage 37; and 2) adsorbent pad 84 is received within reaction well 44. As previously noted, the "teardrop" shape of adsorbent pad 84 facilitates the breakoff of adsorbent pad 84 from drop 108 in second wash well 42 so as to minimize, and preferably prevent, the dragging of the second aqueous solution into drop 110 of the reaction solution in reaction well 44. With adsorbent pad 84 received within reaction well 44, it is intended for lower surface 87 of adsorbent pad 84 to communicate with drop 110 in reaction well 44.

With lower surface 87 of adsorbent pad 84 communicating with drop 110 in reaction well 44, cassette 10 is inserted device into a temperature-controlled heater for a predetermined period of time for amplification. After a predetermined time period, a user may determine the presence of target in 106 in swab sample 116 via a visual inspection of cassette 10 (e.g., through window 49) or by means of a fluorescence reader. Alternatively, it is contemplated to provide an on-device heater 115 powered by USB power or battery may be integrated into cassette 10 for performing the isothermal amplification.

Referring to FIGS. 5A-5B, an alternate configuration of the cassette of the present invention is generally designated by the reference numeral 120. Cassette 120 is identical in structure to cassette 10, except as hereinafter provided. As such, the previous description of cassette 10 is understood to describe cassette 120 as if fully described herein.

In cassette 120, passage 58 through first end wall 18 and passage 37 in second end wall 20 are eliminated. Slider 122 is provided to move adsorbent pad 84 between the first wash position, the second wash position, and the reaction position. Slider 122 is defined by handle portion 124 having a generally flat lower surface 126 configured to form a slidable interface with upper surface 21 of upper wall 22 of cartridge 120. Magnet 128 is embedded in lower surface 126 of handle portion 124, for reasons hereinafter described.

Slider 122 further includes a membrane-support portion 130 receivable within cartridge 120. Membrane-support portion 130 includes a magnetic layer 132 magnetically attracted to magnet 128 embedded in lower surface 126 of handle portion 124. Magnetic layer 132 has a generally flat upper surface 134 configured to slidably engage lower surface 36 of upper wall 22 for movement along pathway 68. Membrane 66 fixed to lower surface 140 of magnetic layer 132. In the depicted embodiment, it is contemplated for membrane 66 to take the form of adsorbent pad 84 wherein upper surface 85 of adsorbent pad 84 is affixed to lower surface 140 of magnetic layer 132. As noted above, adsorbent pad 84 has a generally teardrop-shape configuration.

In operation, membrane-support portion 130 of slider 122 is positioned within swab chamber 50 in an initial position and handle portion 124 is positioned on upper surface 21 of upper wall 22 of cartridge 120 such that the magnetic force generated by magnet 128 embedded in lower surface 126 of handle portion 124 retains membrane-support portion 130 in the initial position, FIG. 5A. With membrane-support portion 130 in the initial position, lower surface 87 of adsorbent pad 84 communicates with swab chamber 50. To test an individual for the presence of target 106, end 52 of swab 54 is inserted into one or both of the nostrils of the individual and rotated therein while pressed against the inside of the nostril to transfer as much nasal discharge onto end 52 of swab 54, hereinafter referred to swab sample 116. Swab 54 is removed from the nostril[s]. End 52 of swab 54 is inserted through opening 56 in first sidewall 14 of cassette 10 and into swab chamber 50. End 52 of swab 54 is pressed against lower surface 87 of adsorbent pad 84 and rotated so as to transfer swab sample 116 onto adsorbent pad 84.

Once swab sample 116 is transferred onto adsorbent pad 84, handle portion 124 of slider 122 is slid in the first direction along upper surface 21 of upper wall 22 of cartridge 120 such that magnet 128, embedded in lower surface 126 of handle portion 124, draws magnetic layer 132 of membrane-support portion 130 therewith and causes membrane-support portion 130 to slide through passage 60 along pathway 68 along lower surface 36 of upper wall 22 to a first wash position wherein adsorbent pad 84 communicates with first wash well 12. If present in passage 60, membrane-support portion 130 pierces puncturable seal 65, thereby allowing membrane-support portion 130 to slide therepast. With adsorbent pad 84 communicating with first wash well 12, it is intended for lower surface 87 of adsorbent pad 84 to communicate with drop 104 in first wash well 12 such that the first aqueous solution washes away any unbound analyte on adsorbent pad 84 with minimal loss of any targets 106 bound to adsorbent pad 84.

After the first aqueous solution washes away any unbound analyte on adsorbent pad 84, handle portion 124 of slider 122 is slid in the first direction along upper surface 21 of upper wall 22 of cartridge 120 such that magnet 128, embedded in lower surface 126 of handle portion 124, draws magnetic layer 132 of membrane-support portion 130 therewith and causes membrane-support portion 130 to slide in pathway 68 along lower surface 36 of upper wall 22 to a second wash position wherein adsorbent pad 84 communicates with second wash well 42. The "teardrop" shape of adsorbent pad 84, as heretofore described, facilitates the breakoff of adsorbent pad 84 from drop 104 in first wash well 12 so as to minimize, and preferably prevent, the dragging of the first aqueous solution into drop 108 of the second aqueous solution in second wash well 42. With adsorbent pad 84 communicating with first wash well 12, it is intended for lower surface 87 of adsorbent pad 84 to communicate with drop 104 in first wash well 12 such that the first aqueous solution washes away any unbound analyte on adsorbent pad 84 with minimal loss of any targets 106 bound to adsorbent pad 84. With adsorbent pad 84 communicating with second wash well 42, it is intended for lower surface 87 of adsorbent pad 84 to communicate with drop 108 in second wash well 42 such that the second aqueous solution washes away any unbound analyte from adsorbent pad 84 with minimal loss of any targets 106 bound to adsorbent pad 84.

After the second aqueous solution washes away any unbound analyte on adsorbent pad 84, handle portion 124 of slider 122 is slid in the first direction along upper surface 21 of upper wall 22 of cartridge 120 such that magnet 128, embedded in lower surface 126 of handle portion 124, draws magnetic layer 132 of membrane-support portion 130 therewith and causes membrane-support portion 130 to slide in pathway 68 along lower surface 36 of upper wall 22 to a third, reaction position wherein adsorbent pad 84 is received within reaction well 44. As previously noted, the "teardrop" shape of adsorbent pad 84 facilitates the breakoff of adsorbent pad 84 from drop 108 in second wash well 42 so as to minimize, and preferably prevent, the dragging of the second aqueous solution into drop 110 of the reaction solution in reaction well 44. With adsorbent pad 84 received within reaction well 44, it is intended for lower surface 87 of adsorbent pad 84 to communicate with drop 110 in reaction well 44, FIG. 5B. With lower surface 87 of adsorbent pad 84 communicating with drop 110 in reaction well 44, the reaction solution of drop 110 in cassette 10 is heated, either by insertion of cassette 10 into a temperature-controlled heater or by use of on-device heater 115 for a predetermined period of time for isothermal amplification. After the predetermined time period, a user may determine the presence of target in 106 in swab sample 116 via a visual inspection of cassette 10 (e.g., through window 49) or by means of a fluorescence reader.

Figure 6:
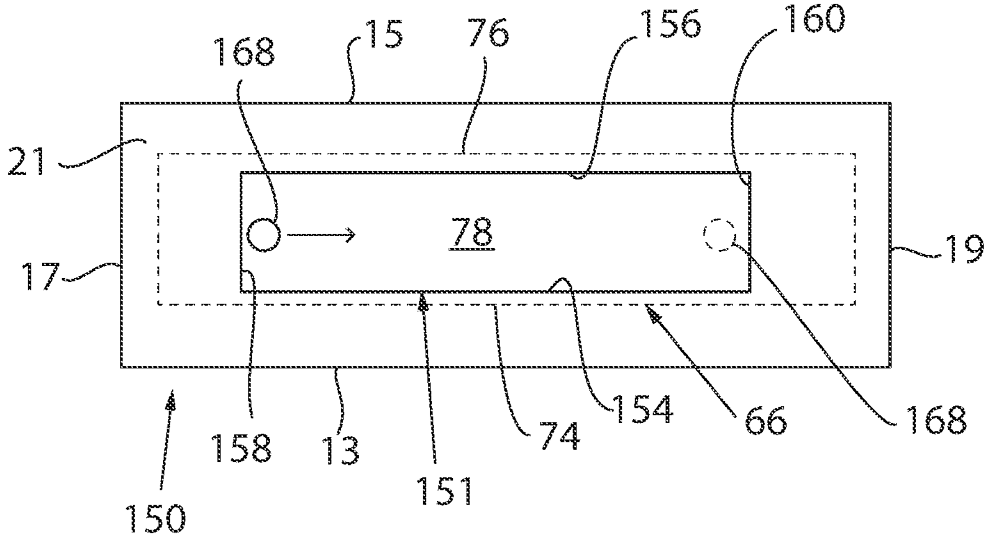
FIG. 6 is a top plan view, with portions broken away, showing a still further alternate configuration of the one-step sample extraction cassette of the present invention.
Figure 12A:
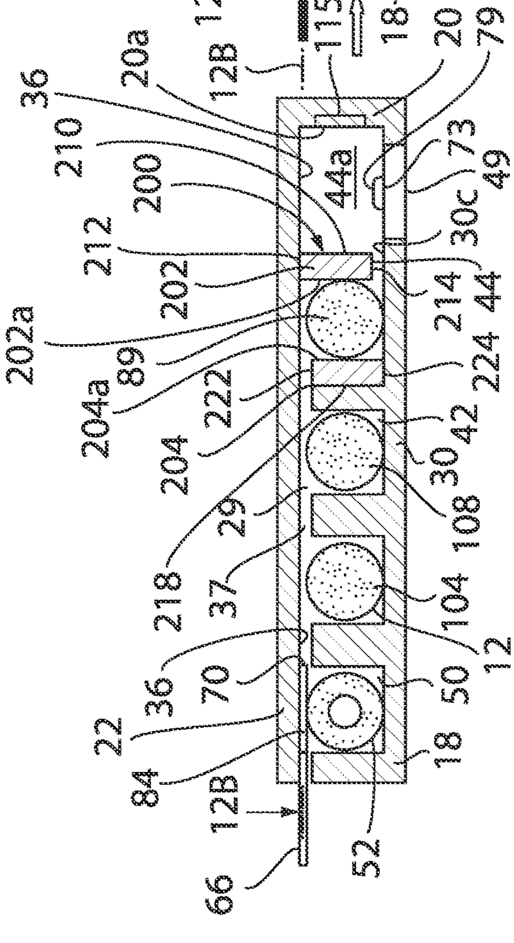
FIG. 12A is a cross sectional view depicting a further, alternate methodology for point-of-care molecular testing for a target in a sample showing a membrane of the one-step sample extraction cassette of the present invention in a first position.
Figure 12B:
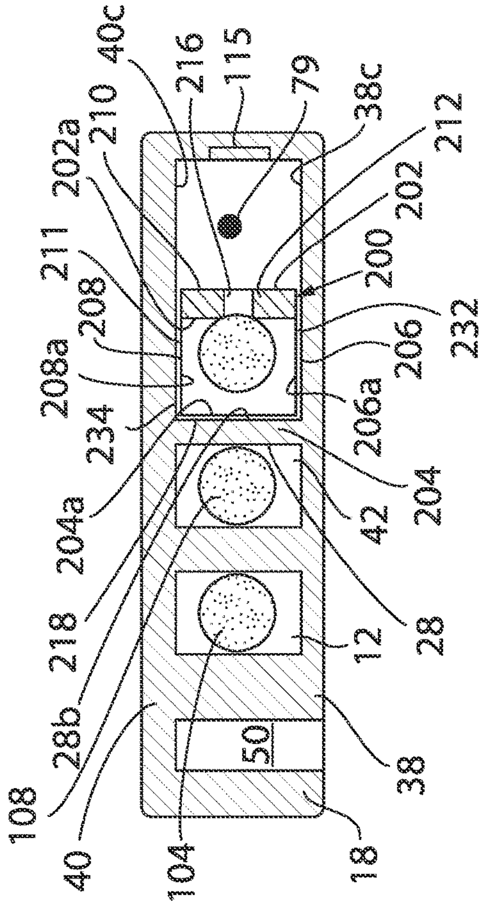
FIG. 12B is a cross sectional view, similar to FIG. 11A, showing the membrane of the one-step sample extraction cassette of the present invention in a second position.
Figure 12C:
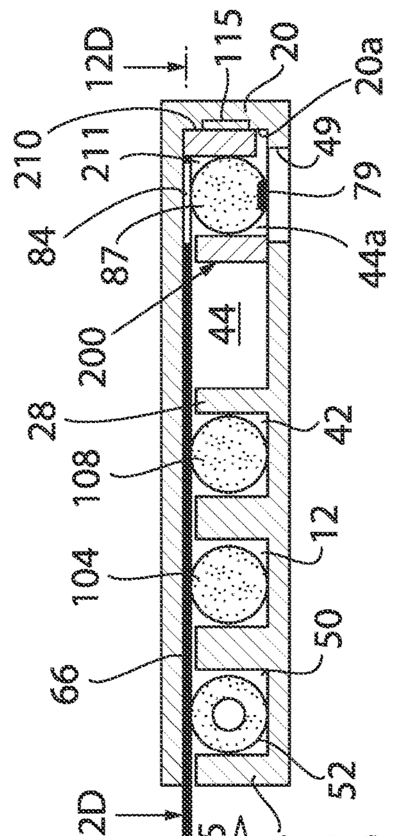
FIG. 12C is a is a cross sectional, similar to FIG. 12A showing a membrane of the one-step sample extraction cassette of the present invention in the second position.
Figure 12D:
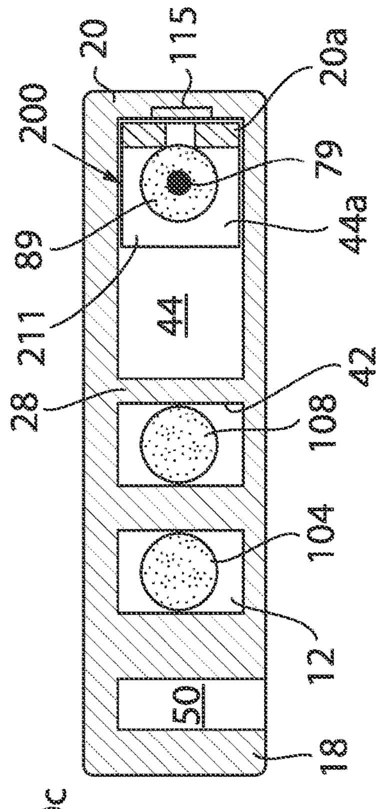
FIG. 12D a cross sectional view of the one-step sample extraction cassette of the present invention taken along line 12D-12D of FIG. 12C.

Referring to FIGS. 6 and 7A-7B, a still further configuration of the cassette of the present invention is generally designated by the reference numeral 150. Cassette 150 is identical in structure to cassette 120, except as hereinafter provided. As such, the previous description of cassette 120 is understood to describe cassette 150 as if fully described herein.

Cassette 150 includes an input storage compartment 170 formed in first end wall 18 which communicates with pathway 68 and an output storage compartment 172 in second end wall 20 which also communicates with pathway 68. Input storage compartment 170 is configured to receive the trailing end 72 of membrane 66 and output storage compartment 172 is configured to receive leading end 70 of membrane 66.

Cassette 150 further includes a slot 151 formed in upper wall 22 thereof. Slot 151 is defined by first and second sidewalls 154 and 156, respectively, lying in corresponding generally parallel planes and first and second end walls 158 and 160, respectively, lying in corresponding generally parallel planes perpendicular to first and second sidewalls 154 and 156, respectively. Slot 151 is intended to guide the slidable movement of slider 152 in order to move adsorbent pad 84 between the first wash position, the second wash position, and the reaction position. More specifically, slider 152 is defined by handle portion 154 having a generally flat lower surface 166 configured to form a slidable interface with upper surface 21 of upper wall 22 of cartridge 150. Support post 168 depends from lower surface 166 of handle portion 154 and is configured to pass through slot 151, for reasons hereinafter described. Membrane 66 is interconnected to slider 152 such that upper surface 78 of membrane 66 slidably engages lower surface 36 of upper wall 22 for movement along pathway 68. Preferably, upper surface 78 forms a sealing relationship with lower surface 36 of upper wall 22 to isolate internal chamber from the external embodiment.

In operation, slider 152 is positioned on upper surface 21 of upper wall 22 of cartridge 150 in an initial position such that support post 168 engages end wall 158, thereby aligning lower surface 87 of adsorbent pad 84 with swab chamber 50, FIGS. 6 and 7A. To test an individual for the presence of target 106, end 52 of swab 54 is inserted into one or both of the nostrils of the individual and rotated therein while pressed against the inside the nostril to transfer as much nasal discharge onto end 52 of swab 54, hereinafter referred to swab sample 116. Swab 54 is removed from the nostril[s]. End 52 of swab 54 is inserted through opening 56 in first sidewall 14 of cassette 10 and into swab chamber 50. End 52 of swab 54 is pressed against lower surface 87 of adsorbent pad 84 and rotated so as to transfer swab sample 116 onto adsorbent pad 84.

Once swab sample 116 is transferred onto adsorbent pad 84, handle portion 154 of slider 152 is slid in the first direction along upper surface 21 of upper wall 22 of cartridge 150 so as to draw membrane 66 along pathway 68 along lower surface 36 of upper wall 22 to a first wash position wherein adsorbent pad 84 communicates with first wash well 12. It can be understood that first and second sidewalls 154 and 156, respectively, act to guide slider 122, and hence membrane 66, as handle portion 154 of slider 152 is slid in the first direction along upper surface 21 of upper wall 22 of cartridge 150 by limiting lateral movement of slider 122 as support post 168 travels through slot 151. In addition, it is intended for leading end 70 of membrane 66 to be received in output storage compartment 172 and for trailing end 72 of membrane 66 to be drawn from input storage compartment 170. With adsorbent pad 84 communicating with first wash well 12, it is intended for lower surface 87 of adsorbent pad 84 to communicate with drop 104 in first wash well 12 such that the first aqueous solution washes away any unbound analyte on adsorbent pad 84 with minimal loss of any targets 106 bound to adsorbent pad 84.

After the first aqueous solution washes away any unbound analyte on adsorbent pad 84, handle portion 154 of slider 152 is slid in the first direction along upper surface 21 of upper wall 22 of cartridge 150 so as to draw membrane 66 along pathway 68 along lower surface 36 of upper wall 22 to a second wash position, wherein adsorbent pad 84 communicates with second wash well 42. Once again, first and second sidewalls 154 and 156, respectively, act to guide slider 122, and hence membrane 66, as handle portion 154 of slider 152 is slid in the first direction along upper surface 21 of upper wall 22 of cartridge 150 by limiting lateral movement of slider 122 as support post 168 travels through slot 151. As previously noted, the "teardrop" shape of adsorbent pad 84, facilitates the breakoff of adsorbent pad 84 from drop 104 in first wash well 12 so as to minimize, and preferably prevent, the dragging of the first aqueous solution into drop 108 of the second aqueous solution in second wash well 42. With adsorbent pad 84 communicating with second wash well 42, it is intended for lower surface 87 of adsorbent pad 84 to communicate with drop 108 in second wash well 42 such that the second aqueous solution washes away any unbound analyte from adsorbent pad 84 with minimal loss of any targets 106 bound to adsorbent pad 84.

After the second aqueous solution washes away any unbound analyte on adsorbent pad 84, handle portion 154 of slider 152 is slid in the first direction along upper surface 21 of upper wall 22 of cartridge 150 so as to draw membrane 66 along pathway 68 along lower surface 36 of upper wall 22 to a reaction position, wherein support post 168 engages end wall 158 and adsorbent pad 84 communicates with reaction well 44. Once again, first and second sidewalls 154 and 156, respectively, act to guide slider 122, and hence membrane 66, as handle portion 154 of slider 152 is slid in the first direction along upper surface 21 of upper wall 22 of cartridge 150 by limiting lateral movement of slider 122 as support post 168 travels through slot 151. Again, the "teardrop" shape of adsorbent pad 84 facilitates the breakoff of adsorbent pad 84 from drop 108 in second wash well 42 so as to minimize, and preferably prevent, the dragging of the second aqueous solution into drop 110 of the reaction solution in reaction well 44. With adsorbent pad 84 received within reaction well 44, it is intended for lower surface 87 of adsorbent pad 84 to communicate with drop 110 in reaction well 44.

With lower surface 87 of adsorbent pad 84 communicating with drop 110 in reaction well 44, the reaction solution of drop 110 in cassette 10 is heated, either by insertion of cassette 10 into a temperature-controlled heater or by use of on-device heater 115 for a predetermined period of time for isothermal amplification. After the predetermined time period, a user may determine the presence of target in 106 in swab sample 116 via a visual inspection of cassette 10 (e.g., through window 49) or by means of an optical reader.

Referring to FIGS. 10A-10B and 11A-11B, alternate methodologies are depicted for loading cassettes 10, 120 and 150 by providing for the volume-free addition of a reagent to reaction well 44. As is known, LAMP solutions have limited stability in liquid form (>0° C.). Although, cassette 10 loaded with drop 110 of a LAMP solution may be successfully stored at temperatures less than −20° C., such a requirement may limit the convenience and distribution of the cassette 10. As such, it is contemplated to utilize a dried (desiccated or lyophilized) LAMP solution that may be reconstituted before or during effectuating the methodology of the present invention. Dried LAMP solutions are stable for approximately one (1) month at room temperature and up to twenty-four (24) months at 4° C.

Figure 10A:
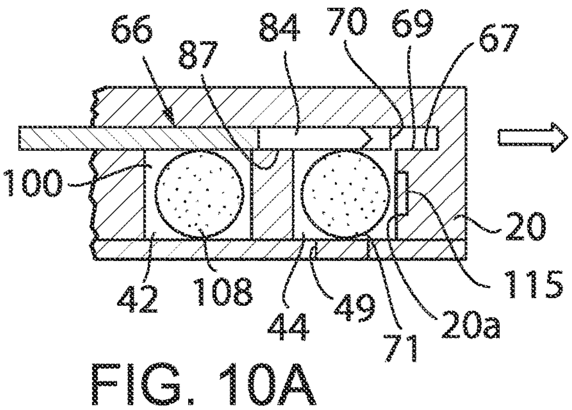
FIG. 10A is a cross sectional view depicting an alternate methodology for point-of-care molecular testing for a target in a sample showing a membrane of the one-step sample extraction cassette of the present invention in a first position.
Figure 10B:
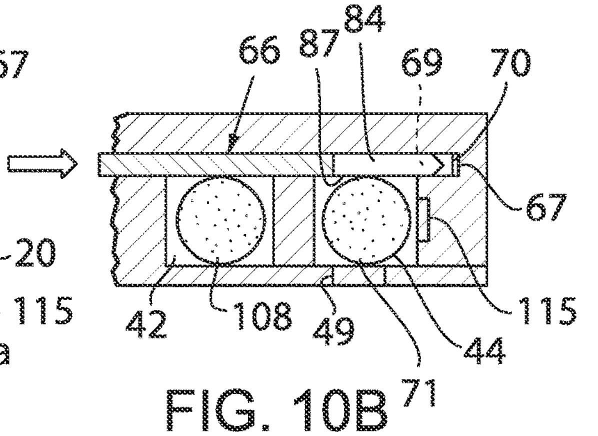
FIG. 10B is a cross sectional view, similar to FIG. 10A, showing the membrane of the one-step sample extraction cassette of the present invention in a second position.

Referring to FIGS. 10A-10B, in the first alternative methodology, ledge 67 is provided in trailing surface 20*a* of second end wall 20 so as to communicate with reaction well 44 and with passage 37 in second end wall 20. With interior chamber 29 dry and free of fluids, a reagent 69 of interest in a LAMP solution is deposited onto ledge 67. Reagent 69 is allowed to dry (such as by desiccation and/or lyophilization) and physically adsorb onto the surface defining ledge 67. Once reagent 69 is dried on ledge 67, interior chamber 29 is filled with a selected fluid, such as oil 100, as heretofore described. Similarly, drops 104 and 108 are provided in first and second wash wells 12 and 42, respectively, as heretofore described. However, instead of providing a drop 110 of LAMP/reaction solution in reaction well 44, it is contemplated for the pipet to deliver drop 71 of water/buffer into reaction cavity 44.

Once loaded, a corresponding cassette 10, 120 or 150 may be used as heretofore described. By way of example, a description of the operation of cassette 10 is hereinafter after provided. However, such description is understood to describe operation of cassettes 120 and 150 as if fully described herein. More specifically, after swab sample 116 is transferred onto adsorbent pad 84, membrane 66 is urged axially in the first direction from the initial position, further into cassette 10, to the first and second wash positions. Thereafter, after the second aqueous solution washes away any unbound analytes on adsorbent pad 84, membrane 66 is urged axially in the first direction further into cassette 10 to a third, reaction position wherein membrane 66 is urged into cassette 10 along pathway 68 such that adsorbent pad 84 is positioned in passage 37, as heretofore described, to communicate with drop 71. Thereafter, adsorbent pad 84 is moved axially in a first direction along pathway 68 toward ledge 67 so as to drag drop 71 therewith and form a liquid bridge between drop 71 and dried reagent 69 on ledge 67. With dried reagent 69 in communication with drop 71, dried reagent 69 reconstitutes and forms the aqueous reaction solution.

With lower surface 87 of adsorbent pad 84 now in communication with the reconstituted reaction solution, cassette 10 is heated, either by insertion of cassette 10 into a temperature-controlled heater or by use of on-device heater 115, for a predetermined period of time for isothermal amplification. After the predetermined time period, a user may determine the presence of target in 106 in swab sample 116 via a visual inspection of cassette 10 (e.g., through window 49) or by means of an optical reader.

Figure 11A:
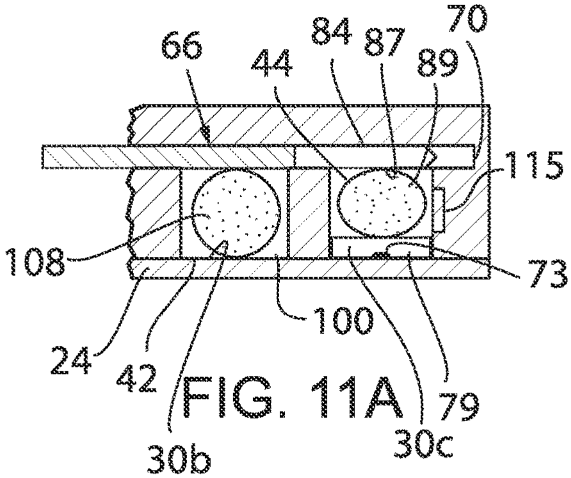
FIG. 11A is a cross sectional view depicting a further, alternate methodology for point-of-care molecular testing for a target in a sample showing a membrane of the one-step sample extraction cassette of the present invention in a first position.
Figure 11B:
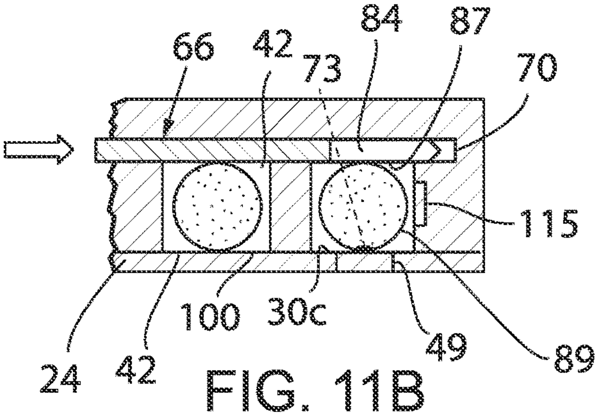
FIG. 11B is a cross sectional view, similar to FIG. 11A, showing the membrane of the one-step sample extraction cassette of the present invention in a second position.

Referring to FIGS. 11A-11B, in the second alternative methodology, with interior chamber 29 dry and free of fluids, a reagent 73 of interest in a LAMP solution is deposited on third well portion 30*c* of upper surface 30 of bottom wall 24. The LAMP solution is allowed to dry (such as by desiccation and/or lyophilization) and physically adsorb onto third well portion 30*c* of upper surface 30 of bottom wall 24. Once reagent 73 is dried on third well portion 30*c* of upper surface 30 of bottom wall 24, a barrier material (such as wax) 79 is deposited over dried reagent 73 and allowed to harden. It is intended for barrier material 79 to be a solid at room temperature, but melt at higher temperatures. After barrier material 79 hardens, interior chamber 29 is filled with a selected fluid, such as oil 100, as heretofore described. Similarly, drops 104 and 108 are provided in first and second wash wells 12 and 42, respectively, as heretofore described. In addition, it is contemplated for the pipet to deliver drop 89 of a water or buffer solution into reaction cavity 44. It is intended for barrier material 79 to have a density that is lower than the density of drop 89 when barrier material 79 is in a liquid form.

Once loaded, a corresponding cassette 10, 120 or 150 may be used as heretofore described. By way of example, a description of the operation of cassette 10 is hereinafter provided. However, such description is understood to describe operation of cassettes 120 and 150 as if fully described herein. After swab sample 116 is transferred onto adsorbent pad 84, membrane 66 is urged axially in the first direction from the initial position, further into cassette 10, to the first and second wash positions as heretofore described. Thereafter, after the second aqueous solution washes away any unbound analyte on adsorbent pad 84, membrane 66 is urged axially in the first direction further into cassette 10 to a third, reaction position wherein adsorbent pad 84 is positioned in passage 37, as heretofore described, and communicate with drop 89.

With lower surface 87 of adsorbent pad 84 now in communication with the drop 89, cassette 10 is heated, either by insertion of cassette 10 into a temperature-controlled heater or by use of on-device heater 115, for a predetermined period of time such that barrier material melts, thereby enabling drop 89 to come into contact with dried reagent 73. With dried reagent 73 in communication with drop 89, dried reagent 73 reconstitutes and forms the aqueous reaction solution. Thereafter, cassette 10 is heated in the temperature-controlled heater or by use of on-device heater 115, for a predetermined period of time, for isothermal amplification. After the predetermined time period, a user may determine the presence of target in 106 in swab sample 116 via a visual inspection of cassette 10 (e.g., through window 49) or by means of an optical reader.

Referring to FIGS. 12A-12D, in the third alternative methodology, movable wall structure, generally designated by the reference numeral 200, is provided in reaction well 44 of a corresponding cassette 10, 120 or 150. More specifically, wall structure 200 includes leading wall 202 and a generally parallel trailing wall 204 interconnected and spaced by first and second side walls 206 and 208, respectively. First and second side walls 206 and 208, respectively, are generally parallel to each other and perpendicular to leading wall 202 and trailing wall 204. Inner surfaces 202*a*, 204*a*, 206*a* and 208*a* of leading wall 202, trailing wall 204, first side wall 206 and second side wall 208, respectively, define sub-chamber 211.

Leading wall 202 includes leading surface 210 directed toward trailing surface 20*a* of second end wall 20. Inner surface 202*a* of leading wall 202 and leading surface 210 of leading wall 202 are interconnected by upper edge 212 and lower edge 214. It is contemplated for upper edge 212 to include notch 216 formed therein, for reasons hereinafter described. Trailing wall 204 includes trailing surface 218 directed toward leading surface 28*b* of second well wall 28. Inner surface 204*a* of trailing wall 204 and trailing surface 220 of trailing wall 204 are interconnected by upper edge 222 and lower edge 224. It is contemplated for upper edge 222 of trailing wall 222 to lie in a plane parallel to and spaced from upper edge 212 of leading wall 202. Similarly, it is contemplated for lower edge 224 of trailing wall 204 to lie in a plane parallel to and spaced from lower edge 214 of leading wall 202.

In operation, wall structure 200 is positioned in a first position in reaction well 44 such that: trailing surface 218 of trailing wall 204 adjacent to or abutting leading surface 28*b* of second well wall 28; leading surface 210 is spaced from trailing surface 20*a* of second end wall 20 so as to define reagent portion 44*a* of reaction chamber 44; lower edge 224 of trailing wall 204 engages and forms a slidable interface with third portion 30*c* of upper surface 30 of bottom wall 24; upper edge 222 of trailing wall 204 is spaced from lower surface 36 of upper wall 22 so as to partially define passage 37; lower edge 214 of leading wall 204 is spaced from third portion 30*c* of upper surface 30 of bottom wall 24; upper edge 212 of leading wall 204 engages and forms a slidable interface with lower surface 36 of upper wall 22; notch 216 in upper edge 212 of leading wall 202 is axially aligned with passage 37; and outer surfaces 230 and 232 of first side wall 206 and second side wall 208, respectively, engage and form slidable interfaces with corresponding third portions 38*c* and 40*c* of inner surfaces 38 and 40 of first and second sidewalls 14 and 16, respectively.

With interior chamber 29 dry and free of fluids, a reagent 73 of interest in a LAMP solution is deposited on third well portion 30*c* of upper surface 30 of bottom wall 24 such that reagent 73 communicates with reagent portion 44*a* of reagent well 44. The LAMP solution is allowed to dry (such as by desiccation and/or lyophilization) and physically adsorb onto third well portion 30*c* of upper surface 30 of bottom wall 24. Once reagent 73 is dried on third well portion 30*c* of upper surface 30 of bottom wall 24, interior chamber 29 is filled with a selected fluid, such as oil 100, as heretofore described. Optionally, a barrier material (such as wax) 79 may be deposited over dried reagent 73 and allowed to harden. It is intended for barrier material 79 to be a solid at room temperature, but melt at higher temperatures. In such an arrangement, after barrier material 79 hardens, interior chamber 29 is filled with a selected fluid, such as oil 100, as heretofore described. Thereafter, drops 104 and 108 are provided in first and second wash wells 12 and 42, respectively, as heretofore described. In addition, it is contemplated for the pipet to deliver drop 89 of a water or buffer solution into sub-chamber 211 defined within wall structure 200. It is intended for barrier material 79 to have a density that is lower than the density of drop 89 when barrier material 79 is in a liquid form.

Once loaded, a corresponding cassette 10, 120 or 150 may be used as heretofore described. By way of example, a description of the operation of cassette 10 is hereinafter provided. However, such description is understood to describe operation of cassettes 120 and 150 as if fully described herein. After swab sample 116 is transferred onto adsorbent pad 84, membrane 66 is urged axially in the first direction from the initial position, further into cassette 10, to the first and second wash positions as heretofore described. Thereafter, after the second aqueous solution washes away any unbound analyte on adsorbent pad 84, membrane 66 is urged axially in the first direction further into cassette 10 such that leading end 70 of membrane 66 is received within and becomes seated in notch 216 in upper edge 212 of leading wall 202 of wall structure 200 and such that adsorbent pad 84 communicates with drop 89 in sub-chamber 211 defined by wall structure 200. As such, as membrane 66 is urged axially in the first direction further into cassette 10, membrane 66 causes wall structure 200 to slide in the first direction toward trailing surface **20*a* of second end wall 20. The spacing between lower edge 214 of leading wall 204 and third portion 30*c* of upper surface 30 of bottom wall 24 allows for leading wall 204 to pass over barrier material 79 is deposited over dried reagent 73 thereon. Membrane 66 is urged axially in the first direction until wall structure 200 is in second position wherein sub-chamber 211 within wall structure 200 is coincident with reaction portion 44*a* of reaction chamber 44**.

With wall structure 200 in the second position and adsorbent pad 84 in communication with drop 89, dried reagent 73 communicates with drop 89 and reconstitutes to form the aqueous reaction solution. Alternatively, if barrier material 79 has been deposited on dried reagent 73, cassette 10 may be heated, either by insertion of cassette 10 into a temperature-controlled heater or by use of on-device heater 115, for a predetermined period of time such that barrier material 79 melts, thereby enabling drop 89 to come into contact with dried reagent 73 and form the aqueous reaction solution, as heretofore described. Once dried reagent 73 reconstitutes to form the aqueous reaction solution, cassette 10 is heated in the temperature-controlled heater or by use of on-device heater 115, for a predetermined period of time, for amplification. After the predetermined time period, a user may determine the presence of target in 106 in swab sample 116 via a visual inspection of cassette 10 (e.g., through window 49) or by means of an optical reader.

Figure 13:
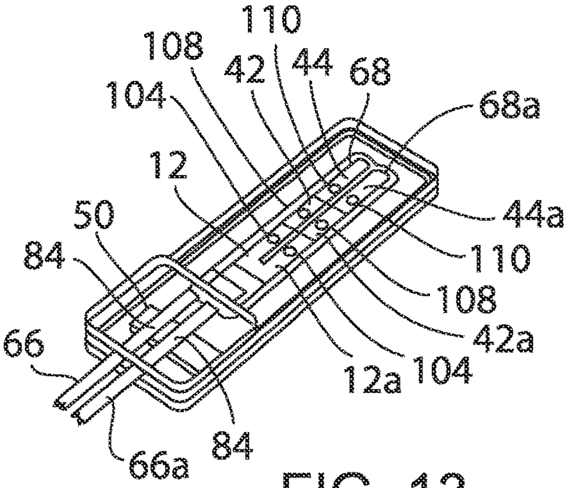
FIG. 13 is an isometric view of a still further an alternate configuration of an alternate configuration of the one-step sample extraction cassette of the present invention.

Referring to FIG. 13, it can be understood that cassettes 10, 120 and 150 may be modified to allow for multiplexing, e.g. allowing for multiple detection targets or inclusion of an internal assay control. For example, cassettes 10, 120 and 150 may be provided with a pathway **68*a* parallel to pathway 68 and communicating with corresponding with first wash well 12*a*, second wash well 42*a*, and reaction well 44*a*, which are identical in structure and adjacent to corresponding first wash well 12, second wash well 42*a*, and reaction well 44*a*. Similarly, a membrane 66*a*, identical in structure to membrane 66, is provided to travel in a first direction along pathway 68*a***.

In operation, end 52 of swab 54 is inserted through opening 56 in first sidewall 14 of a corresponding cassette 10, 120 or 150 and into swab chamber 50. End 52 of swab 54 is pressed against lower surface 87 of adsorbent pad 84 of membrane 66 and against lower surface 87 of adsorbent pad 84 of membrane **66*a*. Swab 54 is rotated so as to transfer swab samples 116 onto adsorbent pads 84 of corresponding membranes 66 and 66*a*. After swab samples 116 are transferred onto adsorbent pads 84, membranes 66 and 66*a*** are urged axially in the first direction from their initial position to the third reaction position, as heretofore described.

With lower surfaces 87 of adsorbent pads 84 of membranes 66 and **66*a* in communication with corresponding drops 110 in reactions wells 44 and 44*a*, the cassette 10, 120 or 150 is heated, either by insertion of cassette 10, 120 and 150 into a temperature-controlled heater or by use of on-device heater 115 for a predetermined period of time for isothermal amplification. After the predetermined time period, a user may determine the presence of target in 106 in swab samples 116 via a visual inspection of cassette 10, 120 or 150** or by means of an optical reader.

Various modes of carrying out the invention are contemplated as being within the scope of the following claims particularly pointing out and distinctly claiming the subject matter that is regarded as the invention.

We claim:

1. A sample extraction cassette for point-of-care molecular testing for a target in a sample provided on a swab, comprising:

a case having:

a chamber configured for receiving the swab;

a wash zone configured for receiving a wash fluid therein;

a reaction zone configured for receiving a reaction fluid therein, the reaction fluid reacting with the target; and a membrane having a contact portion and being slidably moveable in case;

wherein when the swab is received in the chamber of the case, the membrane is moveable between:

a transfer position wherein the contact portion of the membrane communicates with the sample provided on the swab such that at least a portion of the sample is transferred to the contact portion;

a wash position wherein the contact portion of the membrane is out of contact with the swab and communicates with the wash zone; and a reaction position wherein the contact portion of the membrane is out of contact with the swab and communicates with the reaction zone.

2. The sample extraction cassette of claim 1 wherein the wash zone is defined by a wash well in the case, the wash well adapted for receiving the wash fluid therein.

3. The sample extraction cassette of claim 2 wherein the reaction zone is defined by a reaction well in the case, the reaction well adapted for receiving the reaction fluid therein.

4. The sample extraction cassette of claim 3 further comprising an oil receiveable in the wash well and the reaction well, the oil fluidially isolating the wash fluid from the reaction fluid when the wash fluid is received in the wash well and the reaction fluid is received in the reaction well.

5. The sample extraction cassette of claim 1 wherein the case is defined by a plurality of surfaces, the plurality of surfaces being hydrophobic.

6. The sample extraction cassette of claim 1 wherein the contact portion of the membrane is defined by a hydrophilic adsorbent pad.

7. The sample extraction cassette of claim 6 wherein the membrane extends along an axis and has a leading end, the hydrophilic adsorbent pad being spaced from the leading end of the membrane.

8. The sample extraction cassette of claim 1 further comprising a dried reagent in communication with the reaction zone, wherein the reaction fluid is defined by a mixture of the dried reagent and an aqueous solution.

9. The sample extraction cassette of claim 8 further comprising a barrier material positioned over the dried reagent to prevent contamination thereof.

10. A sample extraction cassette for point-of-care molecular testing for a target in a sample provided on a swab, comprising:
a case having:
a chamber configured for receiving the swab;
a wash zone configured for receiving a wash fluid therein;
a reaction zone configured for receiving a reaction fluid therein, the reaction fluid reacting with the target; and
a membrane having a contact portion, the membrane slidably receivable into the case and being moveable between:
a transfer position wherein the contact portion of the membrane communicates with the sample provided on the swab when the swab is received in the chamber such that at least a portion of the sample is transferred to the contact portion;
a wash position wherein the contact portion of the membrane communicates with the wash zone; and
a reaction position wherein the contact portion of the membrane communicates with the reaction zone;
wherein:
the contact portion of the membrane is defined by a hydrophilic adsorbent pad;
the membrane extends along an axis and has a leading end, the hydrophilic adsorbent pad being spaced from the leading end of the membrane; and
the hydrophilic adsorbent pad includes:
a generally arcuate leading edge having first and second ends; and
a trailing edge defined by a first portion extending from the first end of the leading edge and a second portion extending from the second end of the leading edge, the first and second portions of the trailing edge converging as the first and second portions of the trailing edge extend from a corresponding first and second ends of the leading edge.

11. A sample extraction cassette for point-of-care molecular testing for a target in a sample provided on a swab, comprising:
a case having:
a chamber configured for receiving the swab;
a wash zone configured for receiving a wash fluid therein; and
a reaction zone configured for receiving a reaction fluid therein, the reaction fluid reacting with the target;
a membrane having a contact portion, the membrane slidably receivable into the case and being moveable between:
a transfer position wherein the contact portion of the membrane communicates with the sample provided on the swab when the swab is received in the chamber such that at least a portion of the sample is transferred to the contact portion;
a wash position wherein the contact portion of the membrane communicates with the wash zone; and
a reaction position wherein the contact portion of the membrane communicates with the reaction zone; and
a slider slidably connected to the case and operatively connected to the membrane, wherein sliding of the slider relative to the case moves the membrane between the transfer position, the wash position and the reaction position.

12. The sample extraction cassette of claim 9 wherein the barrier material is solid at first temperature and melts at a second, higher temperature.

13. A sample extraction cassette for point-of-care molecular testing for a target in a sample provided on a swab, comprising:
a case having:
a chamber configured for receiving the swab;
a wash zone configured for receiving a wash fluid therein;
a reaction zone configured for receiving a reaction fluid therein, the reaction fluid reacting with the target; and
a membrane having a contact portion, the membrane slidably receivable into the case and being moveable between:
a transfer position wherein the contact portion of the membrane communicates with the sample provided on the swab when the swab is received in the chamber such that at least a portion of the sample is transferred to the contact portion;
a wash position wherein the contact portion of the membrane communicates with the wash zone; and
a reaction position wherein the contact portion of the membrane communicates with the reaction zone;
wherein the membrane includes:
first and second sides and a lower surface interconnecting the first and second sides; and
first and second barbs extending from corresponding first and second sides;
wherein the first and second barbs allow slideable movement of the membrane in a first direction and prevents slideable movement of the membrane in a second, opposite direction.

* * * * *